United States Patent
Zhang et al.

(10) Patent No.: US 8,182,724 B2
(45) Date of Patent: May 22, 2012

(54) METHOD OF ENERGY DISTRIBUTION AND CONSUMPTION CONTROL BASED ON MELT QUALITY IMPROVEMENT FOR PLASTIC INJECTION AND EXTRUSION PROCESSES

(76) Inventors: Gong Zhang, North York (CA); Ling Tian, North York (CA)

(*) Notice: Subject to any disclaimer, the term of this patent is extended or adjusted under 35 U.S.C. 154(b) by 137 days.

(21) Appl. No.: 12/784,911

(22) Filed: May 21, 2010

(65) Prior Publication Data

US 2010/0295199 A1  Nov. 25, 2010

Related U.S. Application Data

(60) Provisional application No. 61/180,658, filed on May 22, 2009.

(51) Int. Cl.
 B29C 45/76 (2006.01)
 B29C 47/92 (2006.01)
(52) U.S. Cl. ....... 264/40.1; 264/40.6; 425/135; 425/144
(58) Field of Classification Search ............... 264/40.6, 264/40.1; 425/144, 143, 135
See application file for complete search history.

(56) References Cited

U.S. PATENT DOCUMENTS

| | | | |
|---|---|---|---|
| 6,852,257 B2* | 2/2005 | Eiva | 264/40.6 |
| 7,672,745 B1* | 3/2010 | Tuszynski | 700/97 |
| 2007/0106420 A1* | 5/2007 | Wyrwoll | 700/200 |
| 2009/0115086 A1* | 5/2009 | Manda | 264/40.6 |
| 2009/0267253 A1* | 10/2009 | Fitzpatrick | 264/40.3 |
| 2010/0065979 A1* | 3/2010 | Betsche et al. | 264/40.6 |

FOREIGN PATENT DOCUMENTS

| | | | |
|---|---|---|---|
| CA | 2576883 A1 | | 3/2006 |
| EP | 0487817 | * | 6/1992 |
| WO | WO 2008/003618 | * | 1/2008 |
| WO | 2009/026673 A1 | | 3/2009 |

* cited by examiner

*Primary Examiner* — Jill Heitbrink
(74) *Attorney, Agent, or Firm* — Bereskin & Parr LLP/S.E.N.C.R.L., s.r.l.

(57) ABSTRACT

A method of improving energy consumption and/or melt quality of injection molding or extrusion machine can include controlling energy input to the melt from screw drive and heat sources. One or more sensors can measure a present value of at least one process parameter associated with the melt. A control algorithm can compare the present value of melt with a set value. If the present value deviates from the set value by more than a predetermined amount, the set value of at least one operating parameter can be adjusted. The algorithm can determine energy transferred to melt material from thermal and mechanical sources, and adjust set values to optimize energy consumption. Process parameters can include melt temperature, melt quality characterized value, prospective throughput or injection cycle time, or prospective energy consumption value. Operating parameters can include barrel heating temperature, screw rotational speed, screw plasticizing back pressure, screw injection speed or screw injection pressure.

20 Claims, 7 Drawing Sheets

Super-Melt Drive Process Control Screen

Note: Super-Melt Process Control can only run in the AUTO Mode | Yes, Run | No, Back 1. Cycle Time (s) & Throughput (Kg/h)   SV [8.8.8.8]   PV [8.8.8.8]   SV [8.8.8.8]   PV [8.8.8.8]
   Cycle Time (s)                       Throughput (Kg/h)

2. Melt Temperature (°C)   SV [8.8.8.8]   PV [8.8.8.8]

3. Screw Speed (rpm)   SV [8.8.8.8]   PV [8.8.8.8]

4. Peak Screw Torque (Nm)   SV. Min. [8.8.8.8]   SV. Max. [8.8.8.8]   PV. Max. [8.8.8.8]

|  | Nozzle | Zone 5 | Zone 4 | Zone 3 | Zone 2 | Zone 1 |
|---|---|---|---|---|---|---|
| 5. Barrel Temperature Profile  SV | 8.8.8.8 | 8.8.8.8 | 8.8.8.8 | 8.8.8.8 | 8.8.8.8 | 8.8.8.8 |
| PV | 8.8.8.8 | 8.8.8.8 | 8.8.8.8 | 8.8.8.8 | 8.8.8.8 | 8.8.8.8 |

6. Energy Consumption from Heating System (KJ/1 cycle)   PV [8.8.8.8]   SV [8.8.8]
   7. Energy ratio (%)

8. Energy Consumption from Driving System (KJ/1 cycle)   PV [8.8.8.8]   PV [8.8.8]

9. Recovery Time (s)   PV [8.8.8.8]

10. Melt Drive Control Mode   [Run at Melt Temp. SV]   [Run at Cycle Time SV]   [Run at Self-Optimum SV]

11. Save Optimized Process Parameter   [Yes]   [No]

[Accept and Exit]

FIG. 5

METHOD OF ENERGY DISTRIBUTION AND CONSUMPTION CONTROL BASED ON MELT QUALITY IMPROVEMENT FOR PLASTIC INJECTION AND EXTRUSION PROCESSES

CROSS-REFERENCE TO RELATED APPLICATION

This application claims priority to U.S. Provisional Application No. 61/180,658 filed on May 22, 2009, the entire contents of which are hereby incorporated herein by reference.

FIELD

The teachings disclosed herein relate to plastic injection molding and extrusion apparatuses, to methods of plastic injection molding and extrusion control system therefor.

BACKGROUND

The following background discussion is not an admission that anything discussed below is citable as prior art or common general knowledge. The documents listed below are incorporated herein in their entirety by this reference to them.

Canadian Patent No. 2,576,883 (Wyrwoll) discloses computer-technological integration of all operational processes in production machines. The disclosure relates to a device for processing plastics, particularly extrusion machines or injection molding machines. In order to allow plastic products to be produced substantially in a fully automated manner while taking into account essential operational processes, first recording means are provided which record the raw material supply and/or changes in the raw material supply, a second recording means is provided that records process parameters and/or material parameters, and a control device is provided which encompasses evaluation means that determine the expected raw material consumption, the expected production time, and/or the expected production costs for a given quantity of the product from the data of the first and second recording means.

PCT Publication No. WO 2009/026673 (Zhang) discloses closed loop control for an injection unit. A method is provided for improving melt quality in an injection unit. A closed loop control system regulates operation of the injection unit in accordance with a reference value for at least one operating parameter. A sensor measures the present value of a load upon the motor which drives an injection screw during operation of the injection unit. A processor compares the present value of the load to a reference value for the load. If the present value of the load deviates from the reference value of the load by more than a predetermined amount, then the processor adjusts the reference value of the at least one operating parameter. Operating parameters can include barrel temperature, back pressure and screw RPMs.

INTRODUCTION

The following discussion is intended to introduce the reader to the more detailed discussion to follow, and not to limit or define any claim.

Embodiments of this specification may provide for controlling operation of an injection molding or extrusion machine, so that at least one parameter, e.g., melt output temperature or melt quality, is maintained at or near a desired or preset value, by controlling a plurality of parameters, which may or may not include the parameter(s) with a desired value. To effect this, an algorithm may be provided to set values of individual operating parameters based on measured values of a plurality of process parameters. The operating parameters can include one or more temperatures set along the length of the barrel and speed or RPM of the injection molding or extrusion machine, and plasticizing back pressure, injection speed, injection pressure, and others. The method may include optimizing heating energy put through heat from barrel heaters and mechanical energy from a screw drive, to match the requirements of desired melt temperature and distribution of temperature uniformity, and this can be calculated based on plastic process theory and resin processing properties.

The method may provide for a first main or outer loop control system, in which parameters are measured, and processed through an algorithm, to determine desired value for each parameter. Individual control loops can then be provided for each parameter, for example, temperature of an individual heating zone, serving to control it to track the preset or desired temperature. Other inputs into the algorithm may include melt characterizing parameters, such as melt temperature, melt quality and transferred energy. Output signals or operating parameters from the algorithm may include barrel heating temperatures, screw RPM or speed, plasticizing back pressure, injection pressure and injection speed.

Various embodiments may provide one or more of the following characteristics: (a) arrive at a better melt quality; (b) provide a higher throughput for the injection molding or extrusion machine; (c) prevent melt temperature override; (d) prevent excessive wear on the screw surface and shut-off valve and excessive shear on the plastic melt; (e) enable a user to set up process parameters on a self-adjusting basis, determined from plastic process theory; (f) reduce energy consumption; (g) to be self-optimizing and adjusting, in dependence upon characteristics of the injection molding or extrusion machine, to provide good quality melt and final parts; (h) basing the method on basic polymer processing theory, in which, generally, about 80% of the melt energy comes from the mechanical driving system and about 20% from barrel heating system; (i) realizing the importance in converting mechanical energy from the screw driving system into heat energy in the melt, a way may be provided to distribute the energy transferred to the melt to achieve a good quality melt with lower melt temperature, thereby reducing energy consumption; and (j) provide a dynamic control system based on plastics processing theory and resin properties, to provide a better melt quality and lower melt temperature.

Other aspects and features of the teachings disclosed herein will become apparent, to those ordinarily skilled in the art, upon review of the following description of the specific examples of the specification.

DRAWINGS

The drawings included herewith are for illustrating various examples of articles, methods, and apparatuses of the present specification and are not intended to limit the scope of what is taught in any way. In the drawings.

DESCRIPTION OF VARIOUS EMBODIMENTS

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors or owners reserve all rights that they may have in any invention disclosed in an apparatus or process described below that is not claimed in this document, for example the right to claim such an invention in a continuing application and do not intend to abandon, disclaim or dedicate to the public any such invention by its disclosure in this document.

In a plastic screw plasticizing process, the extrusion machine process provides for plasticizing and extruding the plastic material and pumping the plastic material through a nozzle or into a mold or through a die. An injection molding machine (IMM) may have a reciprocating screw that provides for plasticizing and injection of the plastic material from the machine through a nozzle into the mold, or it may have a non-reciprocating screw, in which case an alternative mechanism is provided for injecting the plastic into a mold. For example, in a typical two-stage injection molding machine the plastic can be continuously extruded from the machine into an accumulator, and an accumulator can provide for injection of the molten plastic into the mold.

In either case, it is desirable that the plastic melt be delivered at desired parameters, with respect to melt temperature, melt quality and flow rate in unit time or throughput, for example. There are a number of variables or parameters that affect the operation of the injection molding or extrusion machine itself, and that in turn affect the parameters of the plastic ultimately delivered by the machine.

Alternatively, instead of delivering the extruded plastic to the mold, the molten plastic can be used for continuously extruding a shape of uniform cross-sectional profile.

Amongst the machine parameters effecting the parameters of the delivered plastic are heat energy provided by barrel heaters and energy from a drive motor delivered to a screw of the injection molding machine or extrusion machine, both of which result in heat energy being delivered to a plastic. Mechanical motion of the screw causes shearing of the plastic and viscous heat generation, so that the main energy from the screw is dissipated as heat within the plastic.

In screw plasticizing process, there are basically two sources of energy utilized for melting. The first and generally the most important one is the mechanical energy supplied by the screw, which is transferred into heat by a process of viscous heat generation. The second source of energy is the heat supplied by the external barrel heaters and possibly by screw heaters. In most extruders, the screw will supply the majority of the energy, so the key to the plasticating ability of screw extruders is the viscous heat generation in the polymer melt. When the barrel temperature is increased, heat conduction increases, but viscous heat generation will decrease because the viscosity in the melt decreases with increasing temperature. If the reduction in the viscous heat generation is larger than the increase in heat conduction, the net result will be a reduced melting rate. This can occur with polymers whose melt viscosity is relatively sensitive to temperature (as with, for example but not limited to, PMMA, PVC, PA, etc.). When the melt viscosity is not very sensitive to temperature (as with, for example but not limited to, PS, PE, PP, etc.), the reduction in viscous heating with barrel temperature will be small, and as a result the melting rate will likely increase with barrel temperature. Accordingly, different plastic materials have different requirements for attaining optimum process conditions.

Conventional plastic melt plasticizing process control methods are intended to keep the temperature of different zones within an injection molding or extrusion machine at desired values and to maintain the rotational speed of the screw and a back pressure (for injection) at a set value. These various parameters are determined so as to give a desired melt quality.

MFI ("Melt Flow Index") is a number that represents plastic melt flow ability. MFI can mean, for example, how many grams of melt are coming out from a specific test device and nozzle in 10 minutes under a required temperature and load (e.g., 190° C. for HDPE at 2.16 Kg fixed load). The higher the MFI for a particular plastic, the easier it is for the plastic to flow. The lower the MFI, the more difficult it is to flow and the more shear is generated in melt plasticizing.

In processing low MFI resins, or at low process temperature or screw run at high speed, a large melt shear viscosity will generate more heat input into the melt, in turn resulting in a melt temperature that is too high, and can result in wear of the screw surface and shut-off valve (for an injection molding machine). This can be a critical issue for all kinds of screw processing, especially when the screw geometry is not adequate to generate the necessary melting ability and the barrel heating zone's temperature profile has an unsuitable set up. For example, if a resin type or grade is changed and the processing conditions are too difficult, the machine may run with a higher drive power and higher screw rotational speed to get a higher throughput, which can affect melt quality and cause melt temperature override. A high melt temperature with low grade melt quality can cause difficulty in following a mold or in downstream production line.

In conventional control schemes for injection molding or extrusion machines, the individual parameters are controlled separately, for example, individual power heaters are each set to maintain a desired temperature, irrespective of fluctuations and changes in other parameters. The desired values are usually set based on an operator's experience or from a resin producer's operation guide. Thus, for all automatic control devices, the parameters for barrel temperature controllers, screw drive control system and hydraulic control system are set to keep at preset values or as close to a preset value as possible, irrespective of the actual melt quality and temperature.

Figure 1:
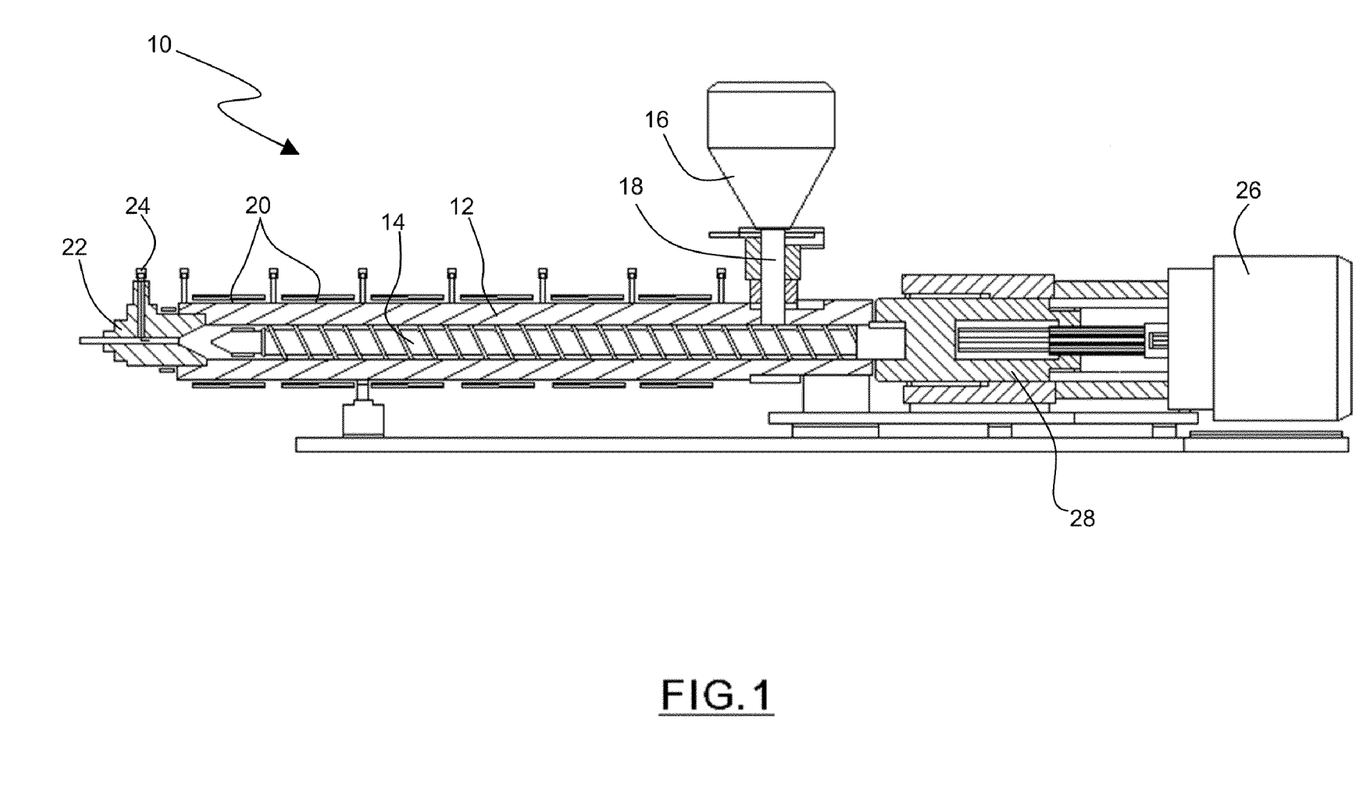
FIG. 1 is a schematic sectional view of an example of an injection molding machine.

FIG. 1 shows an injection molding machine generally indicated at 10, that includes a barrel 12 and a screw 14 within the barrel 12. A material hopper 16 provides a supply of plastic material indicated at 18 to the interior of the barrel 12. Heating bands 20 are provided around the barrel 12, and at its outlet the barrel 12 has a nozzle 22. The machine 10 can also include a nozzle melt temperature sensor 24 near the nozzle head 22.

The drive mechanism for the screw 14 includes a main hydraulic or other motor 26 for screw rotation, and a reciprocating drive unit 28 may be provided; the reciprocating unit 28 can be omitted for manufacture of continuously extruded products and other operations.

Figure 2:
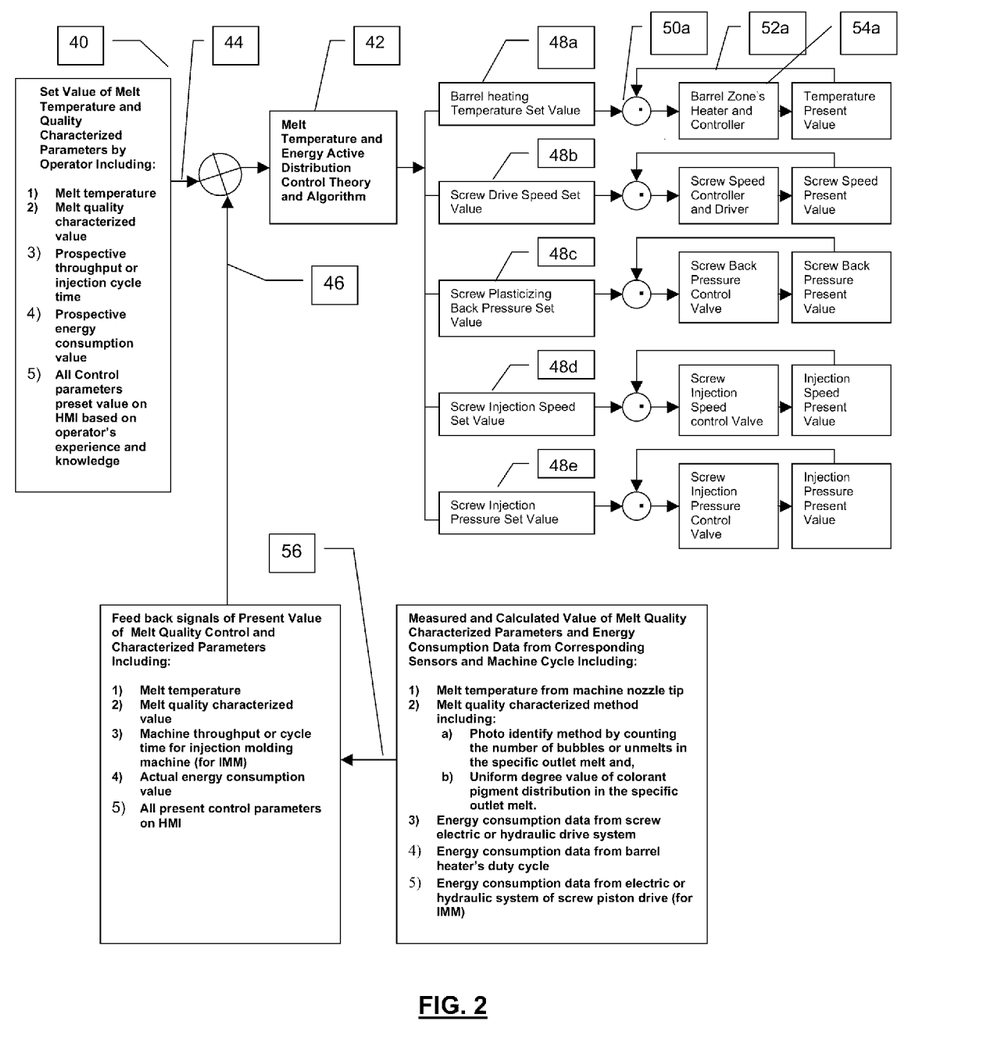
FIG. 2 is a diagram indicating a basic control scheme.

Referring to FIG. 2, there is shown an example of a main control loop indicated generally at 40. The control loop 40 includes an algorithm 42 for determining operating control parameters. A processor or controller (not shown) connected to the machine 10 may be configured to execute the control loop 40 and the algorithm 42. In some embodiments, the controller may be a microprocessor. In some embodiments, the controller may be a central processing unit. In some embodiments, the controller may be a field programmable gate array. A memory connected to the controller may be configured to store instructions executable by the controller, e.g., to carry out the control loop 40 and the algorithm 42.

Desired or set values of selected process parameters are input at 44 and feedback signals of present values of process parameters are input at 46, these inputs 44 and 46 are compared and supplied to the algorithm 42. The inputs 44 and 46 may have one, more than one or no process parameters in common. The inputs at 44 can include desired (or prospective) melt temperature; melt quality; desired (or prospective) throughput or injection cycle time; desired (or prospective) energy consumption; and other control parameters. The inputs at 46 can include values for melt temperature, melt quality, machine throughput or cycle time for injection molding machine, actual energy consumption, and other present control parameters. The melt quality input at 46 may be determined by counting the number of bubbles or unmelts in the specific melt material; by studying the uniformity of colorant pigment distribution in the melt material; or, by a combination thereof.

The algorithm 42 determines set values for operating parameters, e.g., electrical energy delivered to barrel heaters 20 or power supplied to the screw drive motor 26, and/or for individual process parameters, e.g., temperature at a barrel heater 20 or rotational speed of the screw 14. Thus, various aspects of operation of the injection molding machine 10 can be set, either by setting a value for a measured process parameter or by setting a value for an input operating parameter.

The algorithm 42 delivers these values to individual inputs of the injection molding machine 10. Where operating parameters are set, then the configuration of each of these inputs is generally similar. Thus, for a barrel heating temperature, a set or desired (or prospective) value is input at 48a and connects to a summing unit 50a, there is also a feedback loop at 52a of the actual barrel temperature from a barrel temperature heater and sensor 54a. The difference between the desired value of the barrel temperature and the sensed (or present value) barrel temperature, determined by the summing unit 50a, is then used to control the barrel heater and sensor 54a, so that it tracks close to the desired barrel temperature.

A further output from the barrel heater 54a (and it is noted that there may be more than one barrel heater, each provided with a similar control scheme), is connected together with outputs from other sensors, to provide the input signals 46, as indicated by the line 56. As indicated, by other suffixes, other operating parameters may include: control of screw drive speed 48b; control of screw plasticizing back pressure 48c; control of screw injection speed 48d; and control of screw injection pressure 48e.

Figure 3:
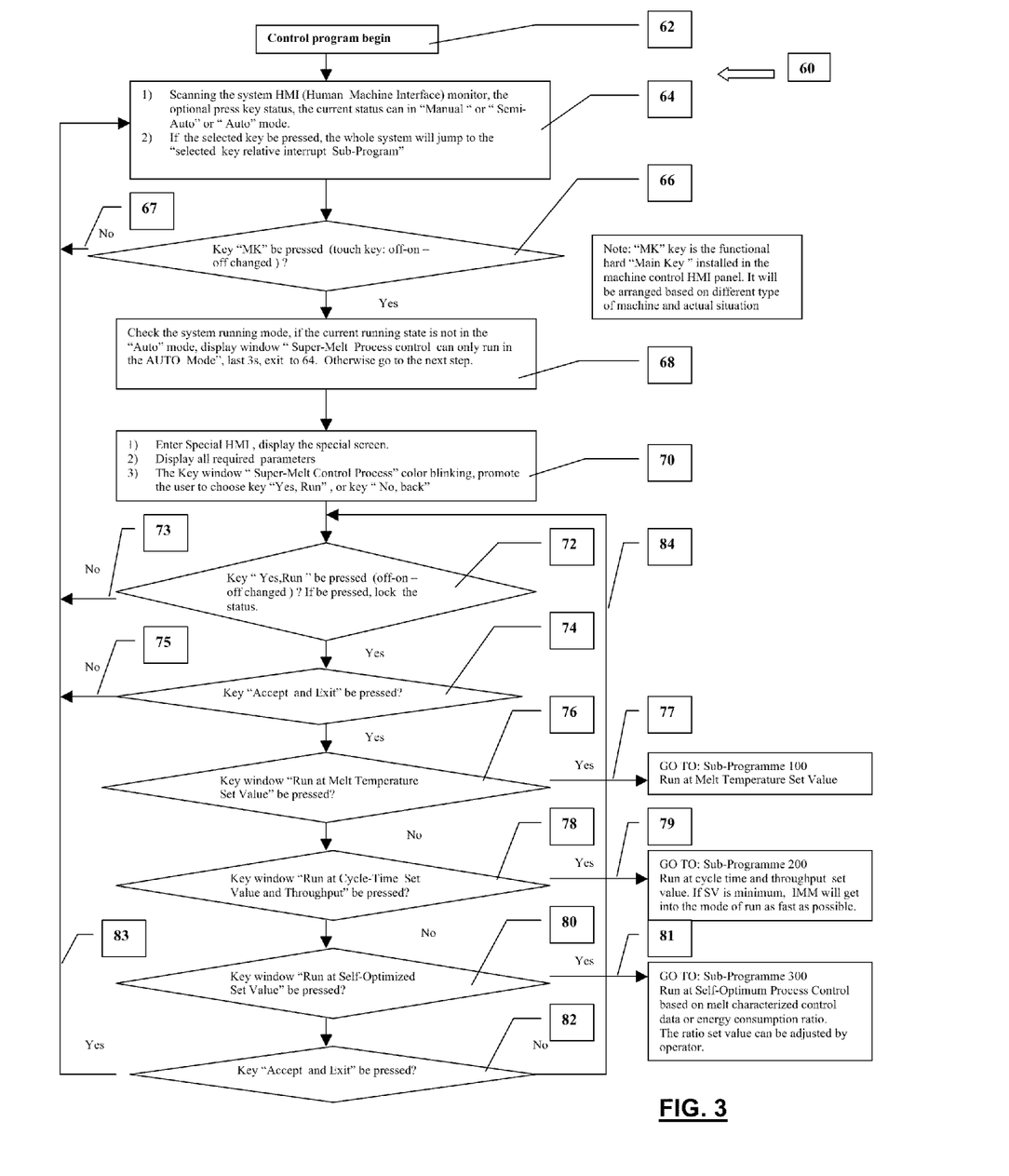
FIG. 3 and FIGS. 4a, 4b and 4c are flow diagrams of individual control programs.

Reference will now be made to FIG. 3, which shows an example of a main control of the control scheme or algorithm 42. This main control loop is indicated at 60.

The main control loop or program 60 includes a beginning input 62. This is connected to the first step of the process indicated at 64. In this first step 64, the HMI system ("human machine interface" which can include, for example but not limited to, a touch screen or a keyboard; see FIG. 5) is scanned to check whether the current status is set as "manual", "semi-auto", or "auto". If one of these selections is made, by pressing an appropriate key, then the algorithm or system effects an interrupt. This is done by way of a relevant sub-program.

At the next step 66, the HMI key control procedure checks to see if a main key, indicated as "MK" and installed on the HMI, has been pressed on or off. If it is off then the program returns at 67 to cycle through the first step 64 again. The configuration of the main key may differ depending on the type of machine and the application.

If the main key, MK, is pressed on, then the HMI key control procedure proceeds to step 68. Here, a check is made on the running mode of the system. If the "auto" mode is not selected, then a window is displayed to the effect that "Super-Melt Process Control can only be run in the AUTO Mode" so as to give an operator a chance to select the auto mode (the term "super melt" is a name given to techniques taught herein). If the "auto" mode is selected, then the algorithm proceeds to the next step. This display can be provided for about three seconds or another suitable waiting time, and in the absence of an auto input, then the HMI key control procedure again exits and returns to the first step 64.

If the auto mode has been selected, then at step 70, the HMI key control procedure can enter a special HMI screen display status. This may also be displayed on a separate, special screen. This may also display all the required parameters. At this step a key window will then display "Super-Melt Process Control", which may be flashing and in color, so as to encourage the user to choose "yes" or "no".

At 72, the algorithm can determine if the Super-Melt Process Control has been selected. If no is selected, then at 73 the process algorithm returns to the initial step 64. If yes is selected, the status is maintained.

The HMI key control procedure then proceeds to the next step 74 where the user is given a chance to press a key indicated as "Accept and Exit". If this is not accepted, then again at 75 the HMI key control procedure returns to the first step 64. If this is accepted, then the HMI key control procedure continues to the next step 76.

At 76 the user is given an option to select "Run at melt temperature set value". If this is pressed, then the HMI key control procedure proceeds, as indicated at 77, to the first sub program 100, described in detail below. If this is not accepted, then the algorithm proceeds to the next step 78.

At step 78 a user is then asked in a window "Run at cycle time set value and throughput". If this is selected by pressing an appropriate key, then, as indicated at 79, the algorithm proceeds to a second sub-program 200, described in detail below. If no is selected, the algorithm proceeds to a next step 80.

In step 80, the user is presented with an option "Run at self optimized set value". If this is selected, again this may be by pressing a key, then the HMI key control procedure proceeds, as indicated at 81, to a third sub-program, also detailed below. If this option is not selected, the algorithm proceeds to a final decision step 82 where the user is presented with an option "Accept and Exit". If this is accepted, then the algorithm proceeds back to the first step 64 as indicated at 83. If this is not accepted, then the algorithm returns to cycle through steps 72-82 as indicated at 84.

Figure 4A:
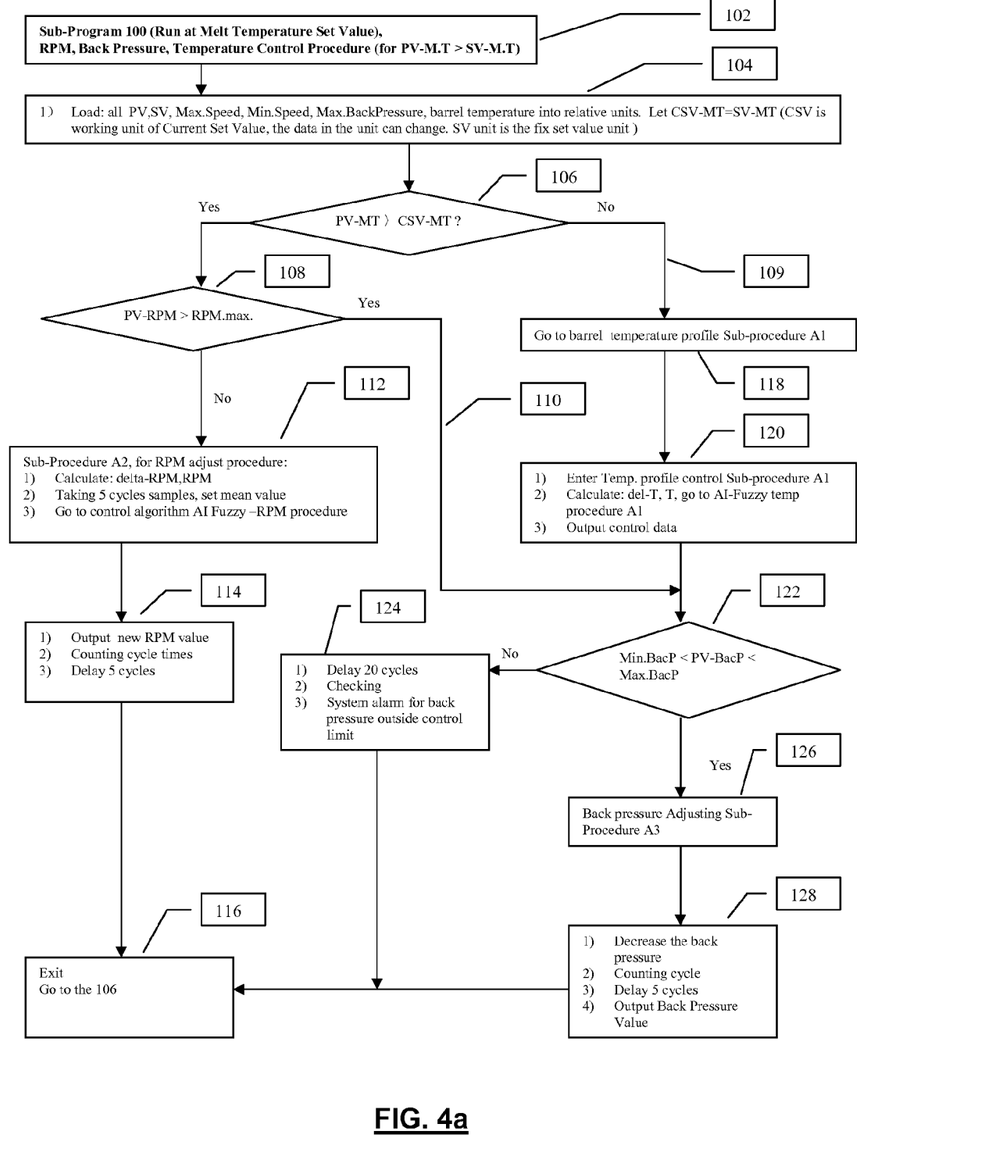

Referring now to FIG. 4a, there is shown a flow chart for a first sub-program 100. This sub-program 100 is commenced at 102. At step (1) indicated at 104, set values (SV) and present values (PV) of pertinent parameters, e.g., maximum speed, minimum speed, maximum back pressure, and barrel temperature, are loaded.

At the next step indicated at 106, the sub-program determines whether the present value of the melt temperature is greater than the current set value of the melt temperature. If the present value of the melt temperature is greater, then the sub-program continues to step 108, while if it is not greater than the set value, the sub-program continues at 109.

At step 108, the sub-program determines if the present value of the screw rotational speed is greater than a maximum set value for the rotational speed. If it is greater, the program continues as indicated along line 110; if it is less, then the sub-program continues to step 112.

At step 112, a sub-procedure, identified as sub-procedure A2, is effected for changing the speed of the screw, so as to achieve the desired melt temperature set value. In this procedure A2, a change in the RPM, set as a ΔRPM is determined. The procedure can take measurements over several cycles (e.g., 5) and determines a mean value. This melt temperature is then input into a fuzzy control algorithm, to determine a new RPM value.

"Cycles" in this context can mean the total time to finish an injection sequence, which includes: mold close; screw rotates to plasticize plastic resin and move backward under back pressure and stop; screw moves forward under high injection pressure to inject melt into the mold; screw hold pressure; part cooling in mold; mold open; and part eject. In some examples, the cycle time may be as short as 3 seconds and as long as more than 1 minute. Measurements can be taken after several cycles to ensure that the machine parameters have generally stabilized.

As indicated at 114 this new RPM value is output and used to control the speed of the screw. The sub-program 100 then proceeds to step 116 after a delay, appropriately selected to allow the speed of the screw to adjust to the new RPM value, has elapsed. In some embodiments, an appropriate delay may consist of 5 cycles. At 116 once the new RPM value has been set, the sub-program exits and returns to 106.

If the present value of the melt temperature is below the current set value of the melt temperature, then sub-routine 100 proceeds to step 118, in which it proceeds to a sub-procedure A1 for adjusting the barrel temperature profile. As indicated in step 120, this sub-procedure A1 is entered and depending upon the melt temperature set value and current melt temperature, which determine T and ΔT, then this ΔT is used in a fuzzy control algorithm. This control algorithm outputs data for setting process and/or operating parameters.

The sub-program then continues at step 122, and also continues at 122 if at step 108 the present value of the screw speed has been greater than the maximum permitted rotational speed. Here, it is determined if the present value of the back pressure is greater than the minimum value of the back pressure and less than a maximum value of the back pressure. If the back pressure is outside these limits, then the sub-program continues at 124.

At 124 the sub-program 100 delays 20 cycles and then checks again, before exiting at 116 to 106.

If, at 122, the present value of the back pressure is within these limits, then the sub-program continues as indicated at 126. If the present back pressure value is greater than maximum limit or less than minimum limit, there may be something wrong with the machine system, for example, the screw RPM or the maximum RPM value is set too high. The control flow chart can go to 124 and then back to 106, and show a alarm on the HMI screen. At step 126, a sub-procedure A3 is effected in which the back pressure is adjusted.

At step 128, this is effected by decreasing the back pressure by a preset amount. Then the cycles are counted. The delay of 5 cycles is effected and then the back pressure value is output.

Figure 4B:
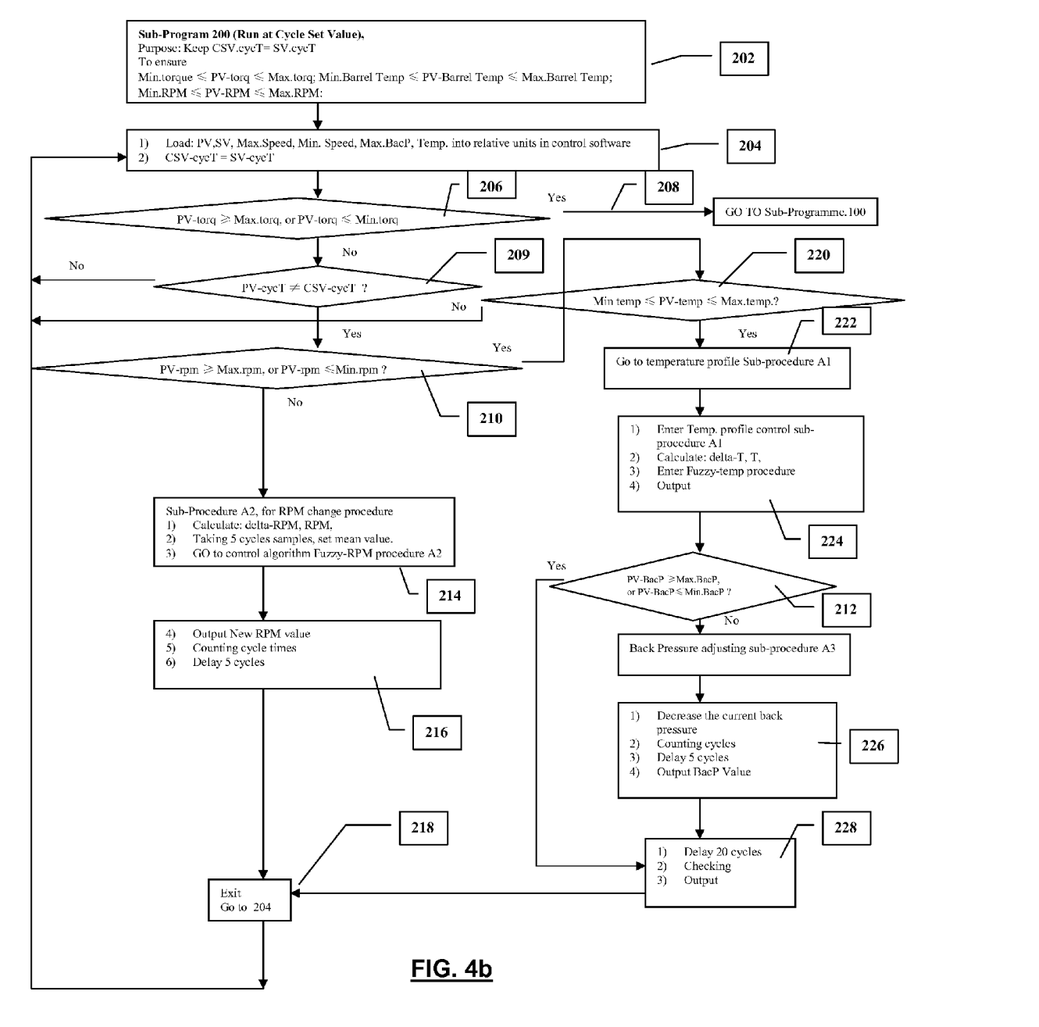

Referring to FIG. 4b, there is shown a second sub-program 200 provided for the purpose or intent of keeping the current working unit of the cycle time equal to the set value of the cycle (CSV.cycT=SV.cycT). Sub-program 200 commences at step 202. After 202, at step 204, the program loads set values and present values for maximum speed, minimum speed, maximum back pressure, and temperature, for example. Also, the current working unit of the cycle time value is set equal to the set value for the cycle time.

At step 206, it is determined if the present value of the torque applied to the screw is greater than or equal to the maximum torque or less than or equal to the minimum torque. If the determination is yes, i.e. the torque exceeds one of the minimum or maximum limits, then the sub-program goes to the sub-program 100 (FIG. 4a, as indicated at 208). If the determination is no, i.e. the present value of the torque is within the minimum or maximum limits, then the sub-program proceeds to step 209.

At step 209, a determination is made concerning the cycle time. If the determination is yes (i.e. values are unequal "≠"), then the sub-program proceeds to step 210. If the determination is no, then the sub-program proceeds back to step 204.

At step 210, a determination is made whether the present value of the speed of the screw, in RPM, is greater then or equal to the maximum value, or whether it is less then or equal at minimum value, i.e. whether the present value of the screw speed is within an allowable minimum or maximum limits. If the determination is yes, then the program proceeds to step 220. If the determination is no, then the present value of the screw RPM is outside the allowable limits, then the sub-program proceeds to step 214.

In step 214, the sub-procedure A2 is effected, as described above. At step 216, the new value of the speed is output. Cycle times are counted, and there is a delay of several cycles. At 218 the sub-program is exited and returned to 204.

In step 220, the present value of the barrel heating zone temperature is compared to maximum and minimum temperatures. If the present value of this temperature is within these limits, yes determination, then the sub-program proceeds to step 222; if the temperature is outside the limits, then the determination no is made and the sub-program returns to step 204. In step 222, sub-procedure A1 is effected, as indicated in step 224 and as detailed above for FIG. 4a.

At 212, a determination is made as to whether the present value of the back pressure is greater than or equal to a maximum back pressure value or a less than or equal to a minimum back pressure value, again whether the present value of the back pressure is within allowable minimum or maximum limits. If the determination is yes that it is within limits, then sub-program proceeds to a step 228. If the determination is no, the back pressure is not within allowable limits, then the sub-program proceeds to a step 226, where the back pressure adjusting procedure A3, as detailed above for FIG. 4a, is implemented. Once this is implemented, then the sub-program proceeds to step 228. The sub-program 200 continues at 228 with a delay of 20 cycles, check and finally supplying an output. The sub-program then exits at 218 to 204.

Figure 4C:
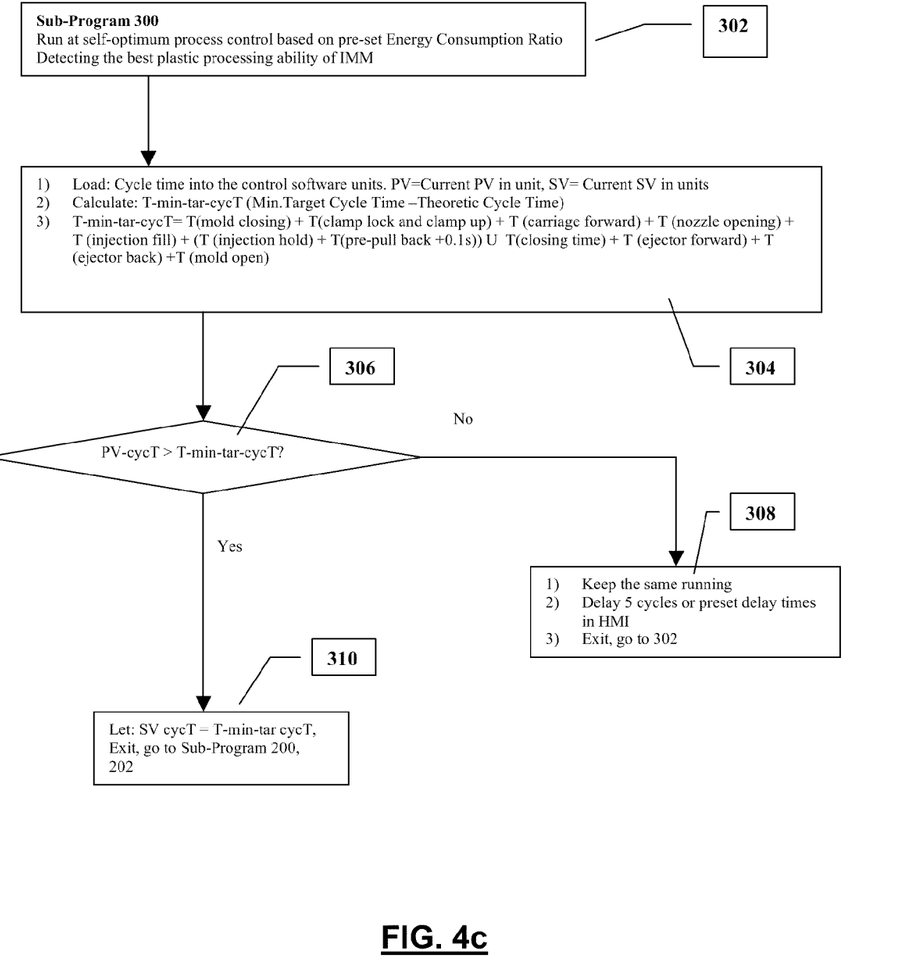

Referring to FIG. 4c, this shows a sub-program 300, beginning at 302, for running at a preset energy consumption ratio. The energy consumption ratio can be an additional set value and present value parameter. The energy consumption ratio can equal the sum of energy provided by all of the barrel heaters divided by the sum of energy provided by the screw drive. In some examples, the ratio can be roughly $20/80$, or $1/4$, but it will change based on different operation conditions, machine heating conditions and driving system design. The HMI screen can include a small screen allowing the operator to preset a ratio number (PV-ratio), that is the highest level of control data. Then the control system can utilize PV-ratio=SV-ratio as a base line to realize self-optimum control, i.e. to control the machine to run at cycle time as short as possible and output melt temperature as low as possible. In actuality, the best conditions for these parameters may not be attainable at the same time, but with control algorithm a relatively optimum working point can be attained, which can be referred to as the machine's best plastic processing ability.

At step 304, the sub-program 300 loads cycle time into the control software. The sub-program then calculates the minimum target cycle time. This is determined as being equal to the sum of: time for mold closing; time for clamp lock and clamp up; time for carriage to move forward; time for nozzle to open; time for injection fill; time for injection hold; time for pre-pull back +0.1 sec (or other time); closing time; time to move the ejector forward; time to move ejector back; and time to open the mold.

Then at step 306 the sub-program determines if the present value of the cycle time is greater than minimum time for the cycle time. If no, the sub-program proceeds to 308.

In step 308, the present cycle time is smaller than minimum cycle time, so the control procedure should go back to check another critical point (melt temperature). There is then a delay of several cycles followed by exit to sub-program 300 at 302.

If the present value of the cycle time is greater than the minimum cycle time, the sub-program proceeds to step 310, wherein the set value of the cycle time is set equal to the target minimum cycle time. Following this, the sub-program exits at 310 to go to the sub-program 200 at 202.

Figure 5:
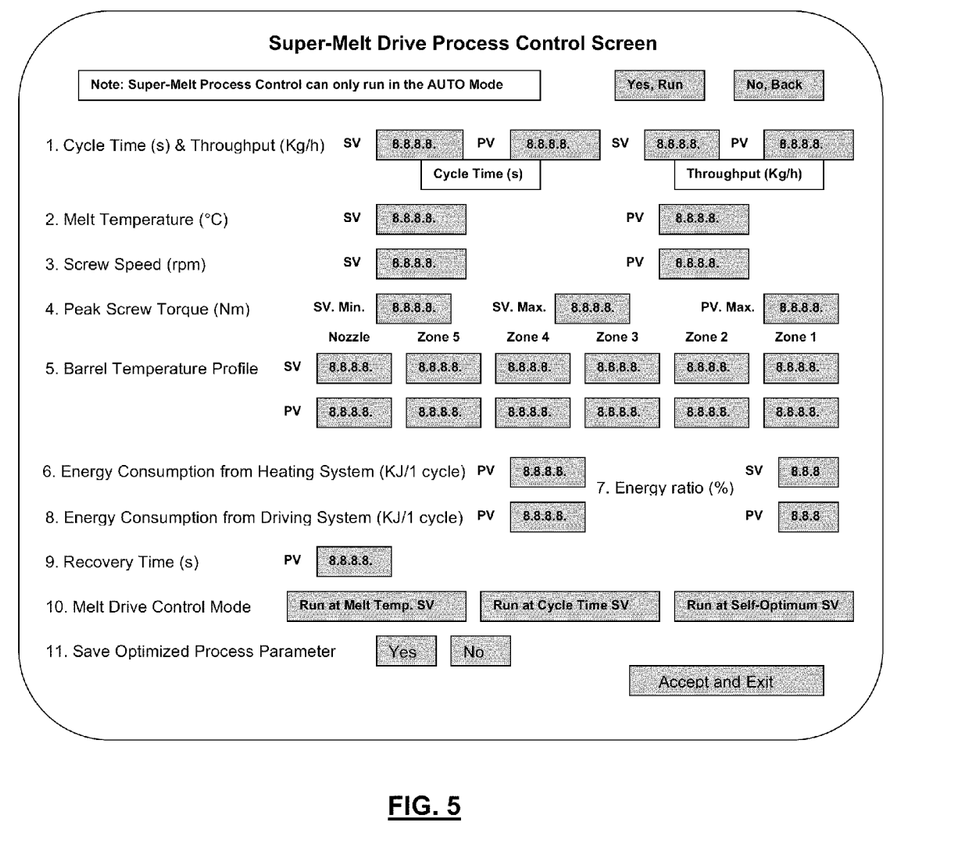
FIG. 5 is an example of a computer interface.

FIG. 5 is an example of a computer interface, referred to herein as a "human-machine interface", or "HMI" for short.

While the above description provides examples of one or more processes or apparatuses, it will be appreciated that other processes or apparatuses may be within the scope of the accompanying claims.

We claim:

1. A method of operating an injection molding or extrusion machine, the method comprising the steps of:
    measuring a present value of at least one process parameter indicative of energy consumption or melt quality;
    providing an algorithm for controlling the machine, and using the algorithm to compare the present value of the at least one process parameter with a set value of the at least one process parameter; and
    if the present value of the at least one process parameter deviates from the set value by more than a predetermined amount, adjusting a set value of at least one operating parameter controlling the operation of the machine,
    wherein the algorithm is configured to calculate a melt energy consumption ratio based on energy transferred to melt material from thermal sources and energy transferred to melt material from mechanical sources, and adjust set values of the at least one process parameter or the at least one operating parameter to optimize energy consumption.

2. The method of claim 1, wherein the at least one process parameter comprises output melt temperature.

3. The method of claim 2, wherein the at least one process parameter further comprises at least one of melt quality characterized value, prospective throughput or injection cycle time, and prospective energy consumption value.

4. The method of claim 3, wherein the melt quality characterized value is determined based on at least one of a number of bubbles or unmelts in the melt material, and uniformity of colorant pigment distribution in the melt material.

5. The method of claim 1, wherein the at least one operating parameter comprises barrel heating temperature.

6. The method of claim 5, wherein the at least one operating parameter further comprises at least one of screw rotational speed, screw plasticizing back pressure, screw injection speed and screw injection pressure.

7. The method of claim 1, wherein the algorithm is configured to receive inputs regarding a plurality of process parameters.

8. The method of claim 1, wherein the algorithm is configured to receive inputs regarding a plurality of operating parameters.

9. The method of claim 1, wherein the algorithm is configured to adjust set values of a plurality of operating parameters.

10. The method of claim 1, wherein at least one of the set value of the at least one process parameter, the set value of the at least one operating parameter, and the predetermined amount is adjustable by an operator.

11. The method of claim 1, wherein the set value of the at least one process parameter and the set value of the at least one operating parameter are dependent upon which material is to be processed by the machine.

12. The method of claim 1, further comprising determining the energy transferred from the thermal sources by monitoring power and duty cycle of heaters.

13. The method of claim 1, further comprising determining the energy transferred from the mechanical sources of screw rotation by monitoring screw torque, screw speed and screw running time.

14. The method of claim 1, further comprising determining the energy transferred from the mechanical sources of screw injection by monitoring melt injection speed, injection pressure and time.

15. The method of claim 1, wherein the algorithm is configured to adjust set values of two or more operating parameters simultaneously.

16. The method of claim 1, further comprising:
    determining the energy transferred from thermal sources by monitoring barrel heaters of the machine;
    determining the energy transferred from mechanical sources by monitoring a screw drive of the machine; and
    calculating the melt energy consumption ratio by dividing a sum of energy provided by the barrel heaters by a sum of energy provided by the screw drive.

17. A method of operating an injection molding or extrusion machine, the method comprising the steps of:
    establishing set values of a plurality of operating and process parameters;
    measuring a present value of at least one of the process parameters;
    comparing the present value of the at least one process parameter with the set value;
    if the present value of the at least one process parameter deviates from the set value by more than a predetermined amount, adjusting the set value of at least one of the operating parameters to optimize energy consumption or improve melt quality; and
    calculating a melt energy consumption ratio based on energy transferred to melt material from thermal sources and energy transferred to melt material from mechanical sources, and adjusting set values of the at least one process parameter or the at least one operating parameter to optimize energy consumption.

18. A system, comprising:
    an injection molding or extrusion machine;
    at least one sensor connected to the machine and configured to measure a present value of at least one process parameter indicative of energy consumption or melt quality;
    a controller connected to the machine and the at least one sensor; and
    a memory connected to the controller and configured to store instructions executable by the controller,
    wherein the controller is configured to compare the present value of the at least one process parameter with a set value of the at least one process parameter, and, if the present value of the at least one process parameter deviates from the set value by more than a predetermined amount, adjust a set value of at least one operating parameter controlling the operation of the machine, and wherein the controller is configured to calculate a melt energy consumption ratio based on enemy transferred to melt material from thermal sources and energy transferred to melt material from mechanical sources, and adjust set values of the at least one process parameter or the at least one operating parameter to optimize enemy consumption.

19. The system of claim 18, wherein the at least one sensor comprises a temperature sensor configured to measure an output melt temperature, and the at least one operating parameter comprises barrel heating temperature.

20. The system of claim 19, wherein the at least one operating parameter further comprises at least one of screw rotational speed, screw plasticizing back pressure, screw injection speed, and screw injection pressure.

* * * * *

UNITED STATES PATENT AND TRADEMARK OFFICE
CERTIFICATE OF CORRECTION

PATENT NO. : 8,182,724 B2
APPLICATION NO. : 12/784911
DATED : May 22, 2012
INVENTOR(S) : Gong Zhang and Ling Tian It is certified that error appears in the above-identified patent and that said Letters Patent is hereby corrected as shown below:

In the Drawings:

In Figure 2, the symbol " ⊙ ", each occurrence, should appear as --⊗--.

In Column 11, lines 6 and 10, the term "enemy" should read --energy--.

Signed and Sealed this
Twenty-fourth Day of July, 2012

David J. Kappos
*Director of the United States Patent and Trademark Office*